Jan. 22, 1963    J. J. ACKELL ETAL    3,074,537
CONTROL SYSTEM FOR LINE CASTING MACHINES
Filed June 29, 1959    7 Sheets-Sheet 1

United States Patent Office 3,074,537
Patented Jan. 22, 1963

3,074,537
CONTROL SYSTEM FOR LINE CASTING
MACHINES
Joseph J. Ackell, Amityville, Herbert L. Paulding, Port Washington, and Richard T. Yu, New York, N.Y., assignors to Dow Jones & Company, Inc., New York, N.Y., a corporation of Delaware
Filed June 29, 1959, Ser. No. 823,503
12 Claims. (Cl. 199—23)

This invention relates to control systems for line casting machines and more particularly to such systems in which individual character bearing matrices are automatically released under the control of a control tape.

There has been developed an automatic control system for an existing line casting machine, such as machines sold under the trade names "Linotype" and "Intertype," which is responsive to a control tape and is extremely rapid in action and highly accurate. Representative systems of this type are disclosed, for example, in Joseph J. Ackell Patents 2,704,595 and 2,704,596 issued March 22, 1955, and 2,846,055 issued August 5, 1958. Such systems customarily embody advancing and analyzing means for the tape which operates under the control of a timing unit to actuate a plurality of relays or other circuit controlling devices. The relays in turn control the selective operation of a plurality of current responsive devices, such as solenoids, which have armature portions adapted to act on the keys of the machine keyboard to enable the release of the various matrices from the appropriate storage magazine of the line casting machine.

Heretofore, primarily because of the time delay incident to the recovery of the key operated release mechanism in the line casting machine after the release of a given matrix, it often has been necessary to operate the control system at a reduced speed in order to allow sufficient time for restoration of the key operated mechanism to its normal position. This has been of special moment in situations in which it is desirable to bring about the successive release of two or more matrices of the same character, such as in printing "ff" in the word "offer," for example, and in some instances it heretofore has been necessary to introduce a special time delay into the system which is responsive only to such repeats. Additionally, in systems of this type, it sometimes has been necessary to accomplish minor adjustments or repairs, such as might be occasioned by the burning out of a solenoid or the wear of various mechanical parts, for example, and heretofore the line casting operation frequently had to be interrupted or had to be controlled manually until the repairs had been completed. The large number of component parts employed in many previous line casting systems, particularly in the mechanisms used for releasing the individual matrices, for example, has increased the incident of such repair, and this has further impaired some of the many advantages resulting from the use of automatic control systems.

One general object of this invention, therefore, is to provide a new and improved control system which is particularly adaptable for automatically controlling the operation of a line casting machine.

More specifically, it is an object of this invention to provide such a system which enables the operation of the line casting machine at a maximum rate.

Another object of this invention is to provide a control system of the character indicated wherein various component parts may be quickly and easily assembled and may be removed from the line casting machine for maintenance purposes, etc.

Still another object of the invention is to provide such a control system utilizing comparatively simple mechanical and electrical elements, which system is economical to manufacture and thoroughly reliable in operation.

As will be understood, a line casting machine is provided with one or more magazines for matrices corresponding to the different characters to be formed in successive lines to be cast. Each magazine customarily carries matrices conforming with a particular style of type to be set up and is mounted on a frame member affixed to the machine. The individual frame members are movable in order to properly locate the appropriate magazine in an operative position. The matrices are selectively released by escapements, and space bands are similarly released for introduction into the assembly of matrices to be formed into a line of proper length. Means are also provided on the line casting machine for moving the released and assembled matrices and space bands into line casting position and for restoring the matrices and space bands to their initial positions in the appropriate magazine after the line has been cast.

In one illustrative embodiment of this invention, an automatic control system for a line casting machine of this type comprises a device for analyzing a control tape, timing means for controlling the operation of the tape analyzing device, an operating unit including a series of solenoids having armature members, or plungers, which are directly connected to the escapements of the line casting machine, means for maintaining the solenoids in rigid relationship with each other and with the escapements, and circuit means responsive to the tape analyzing device for controlling the selective operation of the solenoids.

In accordance with one feature of this invention, the plungers of the various solenoids are connected directly and positively to appropriate rocker members in the escapements of the line casting machine, thereby eliminating the necessity for operation of the machine keyboard and the complicated connections leading from the latter to the rocker members during automatic operation of the machine. These plungers are adapted to return immediately to their unoperated position upon deenergization of the corresponding solenoid. In addition, the connections between the plungers and the rocker members are such as to permit manual operation, when desired, through the use of the keyboard.

In accordance with another feature of the invention, the operating unit and the escapement mechanism are rigidly but detachably mounted directly on a magazine frame of the line casting machine. Thus, the entire assembly may be quickly and easily removed from the machine for maintenance purposes, etc. A mounting bracket of unique design is employed which not only maintains the various components of the operating unit in rigid relationship with each other, but also provides a means for firmly securing these components to the escapement mechanism.

In accordance with a further feature of the invention, the number of mechanical and electrical parts necessary to control the operation of the various escapements have been greatly reduced, thereby reducing the need for repair or replacement such as might be occasioned by wear, etc. of these parts.

The present invention, as well as further objects and features thereof, will be understood more clearly and fully from the following detailed description of a preferred embodiment thereof, when read in conjunction with the accompanying drawings, in which.

In order to facilitate the description of the embodiment of the invention illustrated in the drawings, there will first be given a brief discussion of the general mode of operation of a line casting machine control system constructed in accordance with this embodiment. That is, before describing the novel construction and arrangement of the various parts of such control system, a description will be given of its over-all function in the control of a line casting machine.

Figure 1:
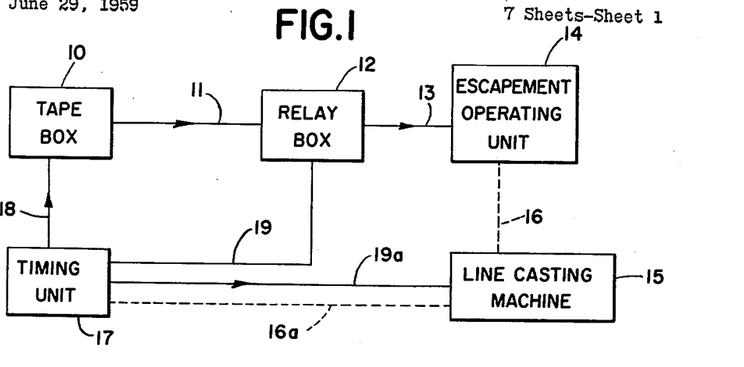
FIGURE 1 is a schematic block diagram of a line casting machine control system constructed in accordance with the invention.

As shown in FIGURE 1 of the drawings, the system is provided with a tape box 10 including the usual tape feeding and tape analyzing devices incorporated therein. This box is connected by means of a cable 11 to a relay system, indicated schematically by the relay box 12. The configuration of the electrical circuitry for the tape box 10 and the relay box 12 is already known in the art, and consequently detailed circuit diagrams for these components have not been shown in the drawings. The boxes 10 and 12, however, illustratively may be constructed generally in accordance with the teachings of the above-mentioned Ackell Patent 2,704,595, in which case the tape box 10 may comprise the tape analyzer 101, for example, while the relay box 12 illustratively may include the coils 1C through 7C, together with the associated armatures and other related components shown in FIGURES 1a through 1d of Ackell Patent 2,704,595.

The relay box 12 is connected by means of a cable 13 to an escapement operating unit 14 which is physically associated with a line casting machine 15, as schematically illustrated by the dotted line 16. The operating unit 14 includes a plurality of current responsive devices, such as solenoids (not shown in FIGURE 1), for physically operating the escapements of the line casting machine to selectively release individual matrices from a storage magazine and thereby assemble a line of type.

The tape box 10 operates under the control of a timing unit 17 and is connected thereto by a cable 18. The timing unit 17 may include a series of control cams (not shown herein but illustrated in said Ackell patents) mounted on a rotating shaft, the speed of rotation of which determines the rate at which the various matrices in the magazine of the line casting machine are released. The timing unit 17 also is connected through suitable circuits directly to the relay box 12 by a cable 19. A cable 19a connects the timing unit 17 with the line casting machine 15 for the purpose of controlling various other functions of the machine. Additionally, certain components of the timing unit 17 are physically associated with the line casting machine, as schematically illustrated by the dotted line 16a. For a more detailed discussion of representative timing units that may be employed in connection with the invention, together with illustrative electrical circuitry that may be used to establish the appropriate connections, reference may be had to the Ackell patents referred to above.

When a control tape in the tape box 10 is advanced to a reading position and an appropriate electrical signal is received from the timing unit 17, a series of coded signals are transmitted over the cable 11 to the relay box 12. These signals cause the selective operation of certain of the relays in the box 12 which serve to close electrical circuits leading through the cable 13 to the escapement operating unit 14. Upon the closing of an appropriate switch (not shown) in the timing unit 17, current is supplied through the cable 19 to the relay box 12 and over the closed circuits in cable 13 to a selected solenoid in the operating unit, thereby releasing a given matrix from one of the magazines of the line casting machine 15. The timing of this releasing operation is thus under the direct control of the timing unit 17. During the release of a series of matrices, space bands are also released at an appropriate time in a manner to be more fully described hereafter. The line casting machine 15 is adapted to assemble the matrices and space bands to form a line of type and to move the assembly into a line casting position. When the casting operation has been completed, means is provided on the line casting machine for returning the matrices and space bans to their initial positions.

Referring now to FIGURES 2 through 7 of the drawings, there is shown the escapement operating unit 14 which is in rigid but detachable relationship with a magazine support frame 20 of the line casting machine 15. For purpose of clarity, much of the electrical wiring connecting the various electrical components of the operating unit 14 has been omitted from the drawings. However, the electrical components of escapement operating units constructed in accordance with the invention may be connected, for example, in a manner similar to that disclosed schematically in any of the Ackell patents referred to heretofore. In the illustrated embodiment of the invention, the electrical circuit diagram for the operating unit 14 is the same in many respects as those portions of FIGURE 1 of Eckell Patent 2,846,055 which include the solenoids 11, the unidirectional current elements, such as the rectifiers 267, and the associated circuitry.

Figure 5:
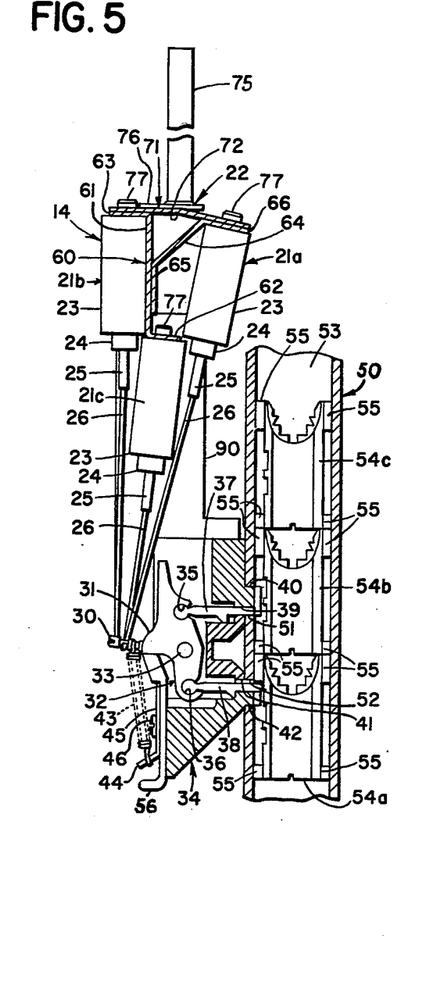
FIGURE 5 is a view, partly in section and partly in elevation, taken generally along the lines 5—5 in FIGURE 3, with a representative matrix storage magazine of the line casting machine illustrated in its operative location.
Figure 6:
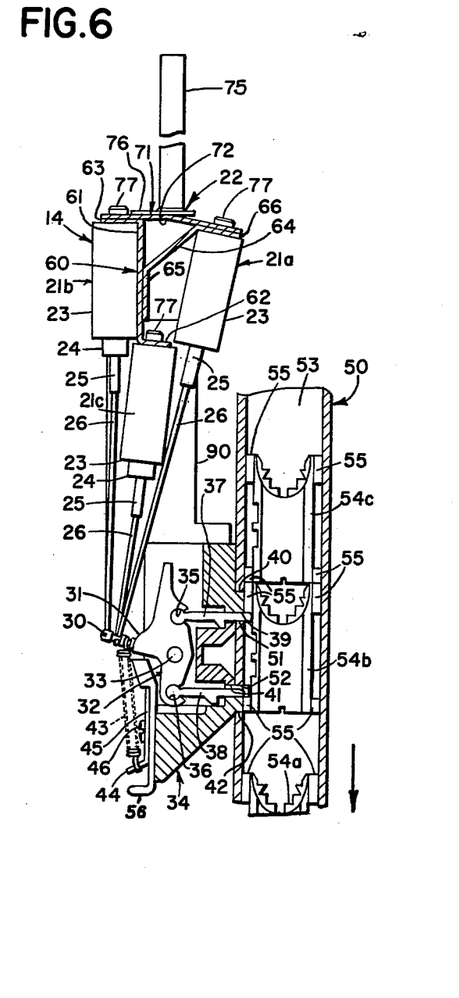
FIGURE 6 is a view similar to FIGURE 5 but illustrating portions of the control system in an operated position.
Figures 7A, 7B:
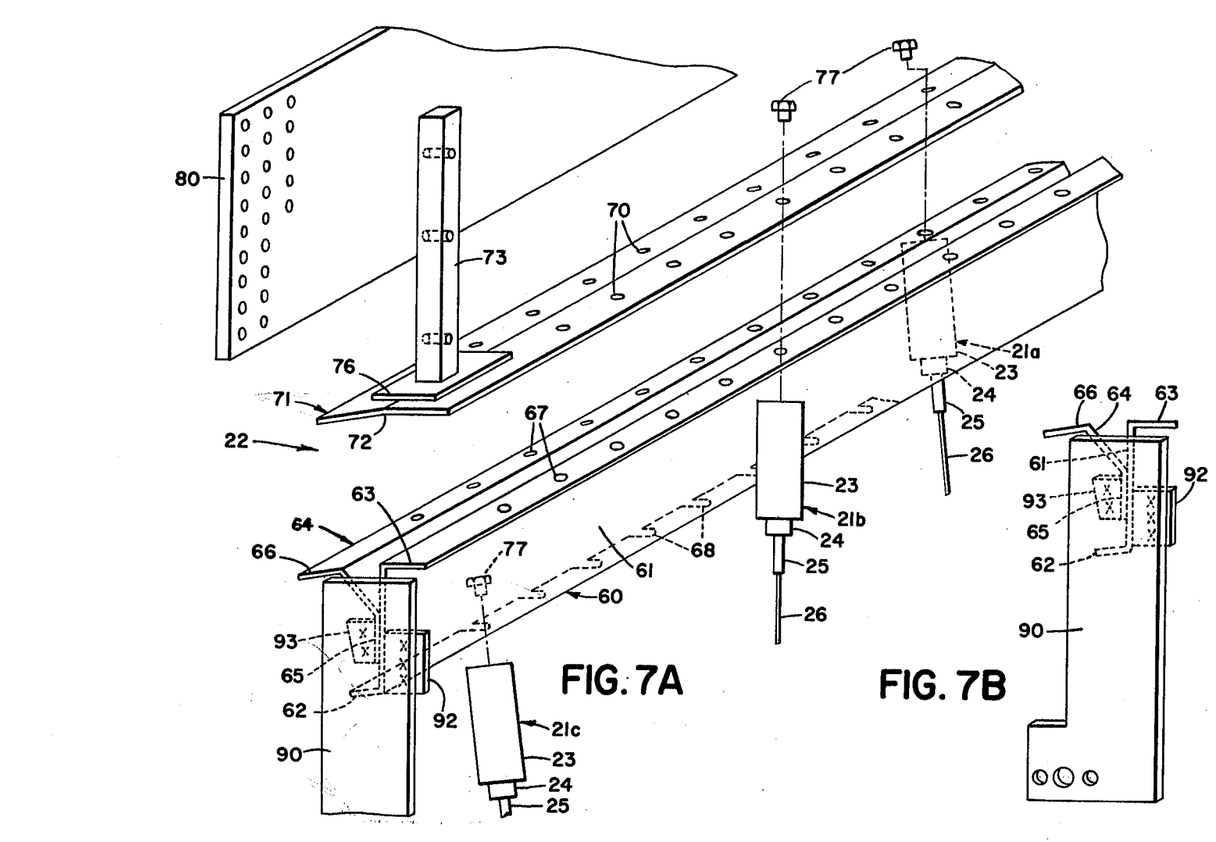
FIGURE 7A is an exploded perspective view, partially broken away for convenience, of a mounting bracket and associated parts useful in connection with the invention.
FIGURE 7B is a perspective view of certain parts of the mounting bracket shown in FIGURE 7A.

The operating unit 14 includes a plurality of current responsive devices, such as the solenoids 21, which are positioned on a mounting bracket 22 and, as best shown in FIGURES 5, 6 and 7, are aligned in three parallel rows. In the drawings, each of these solenoids is identified by the reference numeral 21 followed by an alphabetical suffix indicative of the particular row with which the solenoids are associated. Thus, the solenoids 21a are disposed in one row, the solenoids 21b in another and the solenoids 21c in a third row. These rows extend in a horizontal direction, as viewed in the drawings, and the solenoids in each row are disposed in vertical, side by side relationship with each other. A further description of the arrangement of the solenoids 21, together with a description of the mounting bracket 22, will be found hereafter.

The solenoids 21 each include an energizing winding 23 and an armature portion or plunger 24 which is adapted for reciprocatory movement within the corresponding winding 23 along the longitudinal axis thereof. The lower end of each of the plungers 24 is rigidly affixed in axial alignment with one end of an elongated hollow tube 25, which advantageously is fabricated from a relatively flexible material. One end of an operating rod 26 is disposed in the opposite end of each of the tubes 25 where it is frictionally held in rigid but removable relationship therewith. The flexible tube 25 enables the operating rod 26 disposed therein to extend at an angle with respect to the longitudinal axis of the corresponding plunger 24, for purposes that will appear hereafter.

The free end of each of the operating rods 26 is rigidly connected to a screw 30 which projects outwardly from a rearwardly extending portion 31 of a rocker member 32. The rocker members 32 correspond in number to the number of different releasing operations to be performed by the line casting machine and are adapted to rotate about a horizontal shaft 33 in an escapement mechanism 34. The shaft 33 extends through the central portion of each of the rockers 32 and is suitably supported by the escapement mechanism 34 in the usual manner.

Each of the rockers 32 includes an upper socket 35 and a lower socket 36 which are respectively located above and below the shaft 33. Sockets 35 and 36 have a substantially circular configuration and are adapted to receive corresponding ends of an upper pawl 37 and a lower pawl 38, respectively, which project horizontally from each of the rockers 32 in a direction opposite to that of the screw 30. The projecting ends of the upper pawls 37 are positioned in corresponding apertures 39 in an upper horizontal ledge 40 at the front face of the escapement mechanism 34, while the projecting ends of the lower pawls 38 similarly are located in apertures 41 in a lower horizontal ledge 42 of the mechanism 34.

Figure 3:
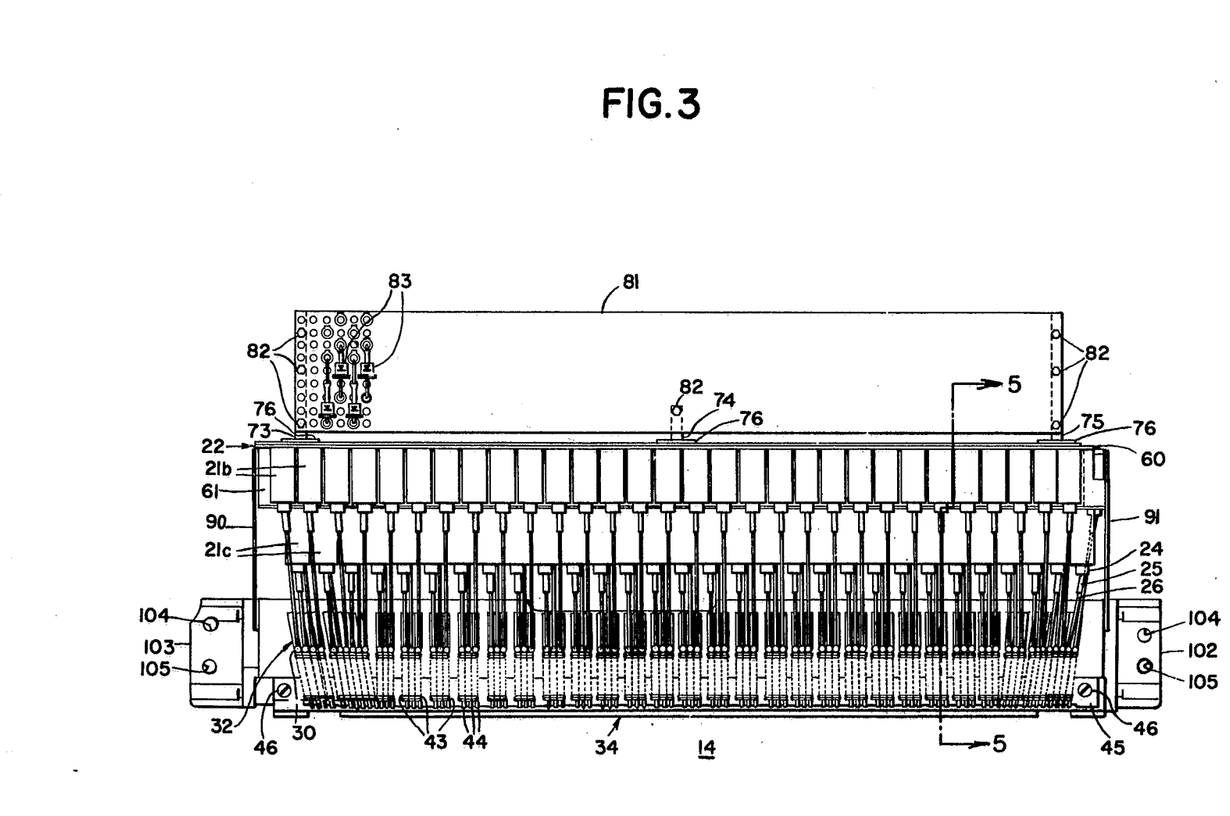
FIGURE 3 is a rear view of the portion of the control system illustrated in FIGURE 2, with various components removed for purposes of clarity.
Figure 4:
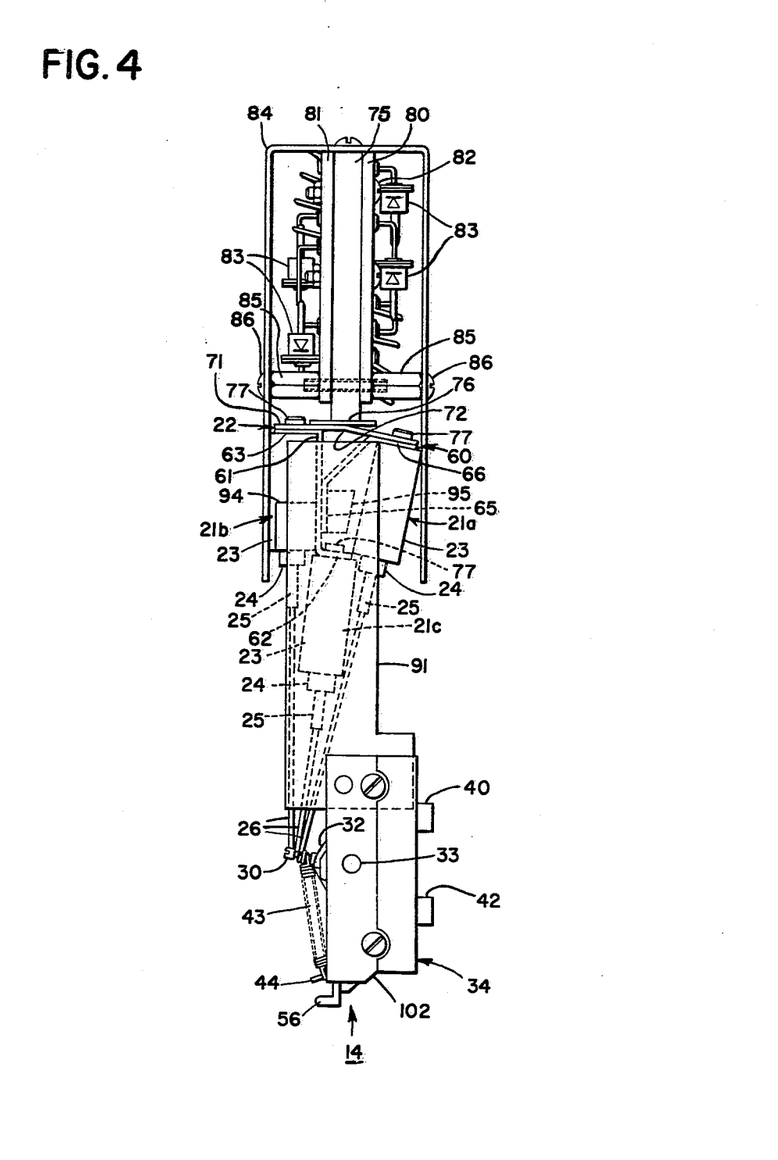
FIGURE 4 is a side view of the portion of the control system illustrated in FIGURE 3.

Each of the rocker members 32 is biased in a counterclockwise direction, as viewed in FIGURES 4, 5 and 6, by an elongated coil spring 43. One end of spring 43 is rigidly affixed to the screw 30 on the corresponding rocker 32 while the other end of spring 43 is secured to a projecting portion 44 of a longitudinally extending bracket 45. As best shown in FIGURE 3, the bracket 45 is fastened to the rear face of the escapement mechanism 34 by machine screws 46 or other suitable means.

A storage magazine 50 (FIGURES 5 and 6) of the line casting machine 15, is adapted to be positioned on the support frame 20 (FIGURE 2) in juxtaposition with the escapement mechanism 34. The side of magazine 50 adjacent the escapement mechanism 34 includes an elongated upper aperture 51 and an elongated lower aperture 52 which are adapted to accommodate the upper ledge 40 and the lower ledge 42, respectively, on the escapement mechanism 34. The magazine 50 includes the usual channels 53, which contain a plurality of matrices 54a, 54b and 54c bearing suitable indicia (not shown) of the particular character to be cast in a line of type. Although for purposes of clarity only one of the channels 53 has been shown in the drawings, it will be understood that the magazine 50 comprises a series of channels 53 in parallel, side by side relationship with each other, corresponding in number to the number of rocker members 32 employed in the escapement mechanism 34 of the line casting machine. Each of the matrices 54a, 54b and 54c is of substantially flat, rectangular construction and includes four projecting lugs 55 which extend from the longitudinal sides thereof at each corner. In the operative position of the magazine 50, the matrices in a given channel 53 are in coplanar alignment with each other and extend in a substantially vertical plane.

In its unoperated position, the lower pawl 38 of each of the rocker members 32 extends into the magazine 50 through the corresponding aperture 41 in ledge 42 and engages the lower end of the upper projecting lug 55 along the adjacent longitudinal side of the lowermost matrix 54a, as shown in FIGURE 5. Matrix 54a is thereby supported in its proper position in the magazine channel 53. The upper pawl 37 of each rocker member 32 is located in the corresponding aperture 39 in ledge 40 in a position withdrawn from the interior of the magazine 50. In the FIGURE 5 position, aperture 39 is located intermediate the two lugs 55 along the adjacent longitudinal side of the matrix 54b, which rests against the upper edge of the lowermost matrix 54a and is supported thereby.

As indicated heretofore, the tape box 10 (FIGURE 1) is adapted to furnish information to the relay box 12 corresponding to the desired character to be formed in a line of type. Appropriate circuits are closed by the relays (not shown) in the box 12, and an energizing signal is transmitted over these circuits to one of the solenoids 21 in the operating unit 14. Upon the receipt of this energizing signal, the selected solenoid 21 draws the corresponding plunger 24, together with the tube 25 and the operating rod 26, in an upward direction, as shown in FIGURE 6. The resulting upward force exerted on the screw 30 causes the member 32 to rock about the shaft 33 in a clockwise direction, as viewed in the drawings, against the tension provided by the spring 43. The lower pawl 38 is withdrawn from the interior of the magazine 50, thereby permitting the lowermost matrix 54a to drop from the magazine to the line of type being formed. Clockwise rotation of the rocker member 32 about shaft 33 also moves the upper pawl 37 into the interior of the magazine 50. Pawl 37 comes in contact with the adjacent upper lug 55 of the matrix 54b as this matrix slides along the channel 53, and thus the matrix 54b is prevented from dropping from the magazine 50 and is held in a position about halfway between that of the matrices 54a and 54b in FIGURE 5.

Upon deenergization of the selected solenoid 21, the spring 43 immediately returns the corresponding rocker member 32, the operating rod 26, the tube 25 and the plunger 24 to their initial (FIGURE 5) position. As the rocker member 32 returns, the upper pawl 37 is withdrawn from the interior of the magazine 50 and thereby enables the matrix 54b to drop a short distance. Before the upper lug 55 on the side of matrix 54b adjacent the member 32 passes the lower aperture 41 in ledge 42, however, the lower pawl 38 protrudes through this aperture into the interior of the magazine 50 and comes in contact with the adjacent upper lug 55, thereby arresting the downward movement of the matrix 54b in the position formerly assumed by matrix 54a. The apparatus is thus immediately conditioned for the release of the matrix 54b should another signal be received by the corresponding solenoid 21.

In this manner successive matrices are quickly brought into the discharge position and may be discharged from the magazine 50 and, together with appropriate space bands (not shown), assembled in a line for delivery to the casting point. By providing a direct, physical connection between the various solenoid plungers 24 and the corresponding rockers 32, a particular matrix 54a may be released immediately upon the receipt of an energizing signal by the appropriate solenoid 21. Upon the removal of this signal, the coil spring 43 immediately returns the rocker 32 to its initial position and thereby prepares the apparatus for the release of a successive matrix 54b from the same channel. In the illustrated embodiment of the invention, the control shaft (not shown) in the timing unit 17 (FIGURE 1) may be rotated at a speed such that the various matrices are uniformly and automatically released at a rate of 550 per minute. This high and uniform operating speed has been attained without the necessity for introducing special time delays, complicated mechanical or electrical components, etc., into the matrix releasing system. Of course, other operating speeds may be employed without departing from the spirit or scope of the invention, and in some instances the matrices advantageously may be released at a speed higher, as well as lower, than that specifically referred to above.

The above construction also permits manual operation of the line casting machine, when desired, through the use of the machine keyboard (not shown). Thus, the escapement mechanism 34 includes a series of plungers 56, each of which corresponds with one of the rocker members 32 and is adapted to move in a vertical direction, as viewed in the drawings. Each plunger 56 is controlled by the keyboard of the line casting machine and moves upwardly upon actuation of the appropriate key, thereby rocking the corresponding rocker member 32 and releasing one of the matrices in a manner similar to that described heretofore.

The various solenoids 21, together with other components comprising the escapement operating unit 14 of the control system, are rigidly held in spaced, side by side relationship with each other and in an operative position with respect to the escapement mechanism 34 by the mounting bracket 22, the detailed construction of which is best shown in FIGURES 7A and 7B. The bracket 22 includes an elongated lower section 60 having a portion 61 which is disposed in a substantially vertical plane, as viewed in the drawings. A flange 62 extends horizontally in one direction from the lowermost edge of the portion 61, while a second flange 63 extends from the upper edge of portion 61 in a direction opposite to that of the flange 62. The section 60 of bracket 22 additionally includes a second portion 64 having flanges 65 and 66 located in planes which are disposed at an angle of slightly less than 90 degrees in relation to each other. The flange 65 of portion 64 is welded or otherwise rigidly affixed to the vertical portion 61 and is longitudinally disposed with respect thereto, as shown in FIGURES 4 and 7A. The flange 66 of portion 64 is disposed substantially in the same plane as the upper flange 63 on the portion 61 but extends in a direction opposite to that of flange 63 at a slight, downward angle with respect thereto.

The flanges 63 and 66 on the respective portions 61 and 64 of the lower section 60 of mounting bracket 22 are each provided with a series of apertures 67 therein. These apertures are spaced longitudinally along the flanges 63 and 66, and the number of apertures in each flange corresponds to the number of solenoids 21b or 21a, respectively, in the appropriate row. Additionally, the lower flange 62 on the portion 61 of bracket section 60 includes a plurality of recesses 68 which likewise are longitudinally spaced thereon and correspond in number to the number of solenoids 21c.

The rows of apertures 67 are adapted to be aligned with a pair of mating rows of apertures 70 on an elongated upper section 71 of the mounting bracket 22. The section 71 is adapted to rest on the upper surfaces of the flanges 63 and 66 of the lower bracket section 60 and includes a slight bend 72 adjacent the longitudinal center line thereof for this purpose. Bracket section 71 additionally includes three posts 73, 74 and 75 (FIGURE 3) which extend in an upward direction, as viewed in the drawings, and are respectively affixed at the lower ends thereof to corresponding plates 76. The plates 76 for the posts 73 and 75 are welded or otherwise rigidly positioned adjacent each end of the bracket section 71. Post 74, on the other hand, is somewhat shorter than posts 73 and 75 and is located on its corresponding plate 76 at the approximate longitudinal center of the bracket section 71.

The two sections 60 and 71 of the mounting bracket 22 are maintained in rigid relationship with each other by a plurality of solenoid mounting screws 77 which are adapted to be inserted in the solenoids 21a and 21b at the ends thereof opposite the ends connected to the operating rods 26. The mounting screws 77 for the row of solenoids 21a are inserted in corresponding apertures 70 and 67 in the upper bracket section 71 and in the flange 66 of the lower bracket section 60, respectively, and these solenoids 21a depend from the flange 66 and are rigidly held in position by the mounting screws 77. The mounting screws 77 for the row of solenoids 21b are inserted in mating apertures 70 and 67 in the upper bracket section 71 and in the flange 63 of the lower bracket section 60, respectively. These latter mounting screws 77 similarly hold the row of solenoids 21b rigidly in position beneath the flange 63, and the solenoids 21b depend from this flange on a side of the bracket section 60 opposite to that of the solenoids 21a. The lowermost row of solenoids 21c is similarly provided with mounting screws 77 which extend through the recesses 68 in the lower flange 62 of bracket section 60. The solenoids 21c depend from the flange 62 and are rigidly held in position on the bracket section 60.

As best shown in FIGURE 4, two elongated panels 80 and 81 are vertically disposed on the upper bracket section 71 and are respectively secured to opposite sides of the posts 73, 74 and 75 by screws 82 or other appropriate means. The panels 80 and 81 are thus located immediately above the solenoids 21 on the mounting bracket 22 and are adapted to accommodate a plurality of rectifiers 83 which, for example, may be electrically connected to the corresponding solenoids 21 in a manner similar to the connections between the solenoids 11 and the rectifiers 267 shown schematically in FIGURE 1 of the aforementioned Ackell Patent 2,846,055. Although for purposes of clarity only some of the rectifiers 83 have been illustrated in the drawings, it will be understood that these rectifiers extend substantially along the entire, exposed surfaces of the panels 80 and 81 and, in this particular embodiment of the invention, correspond in number to the number of rectifiers 267 illustrated schematically in Ackell Patent 2,846,055. By mounting the rectifier panels 80 and 81 immediately adjacent the solenoids 21, the amount of electrical wiring necessary to connect the rectifiers 83 with the appropriate solenoids 21 in a given installation can be maintained at a minimum.

The use of rectifiers, such as the rectifiers 83, in the control system of a line casting machine has many important advantages, some of which are summarized in the aforementioned Ackell Patent 2,846,055. However, in some embodiments of the present invention the rectifiers 83 may be safely omitted without departing from the spirit or scope of the invention. In these latter embodiments, there is of course no necessity for the provision of the rectifier panels 80 and 81, the mounting posts 73, 74 and 75, and related parts.

Figure 2:
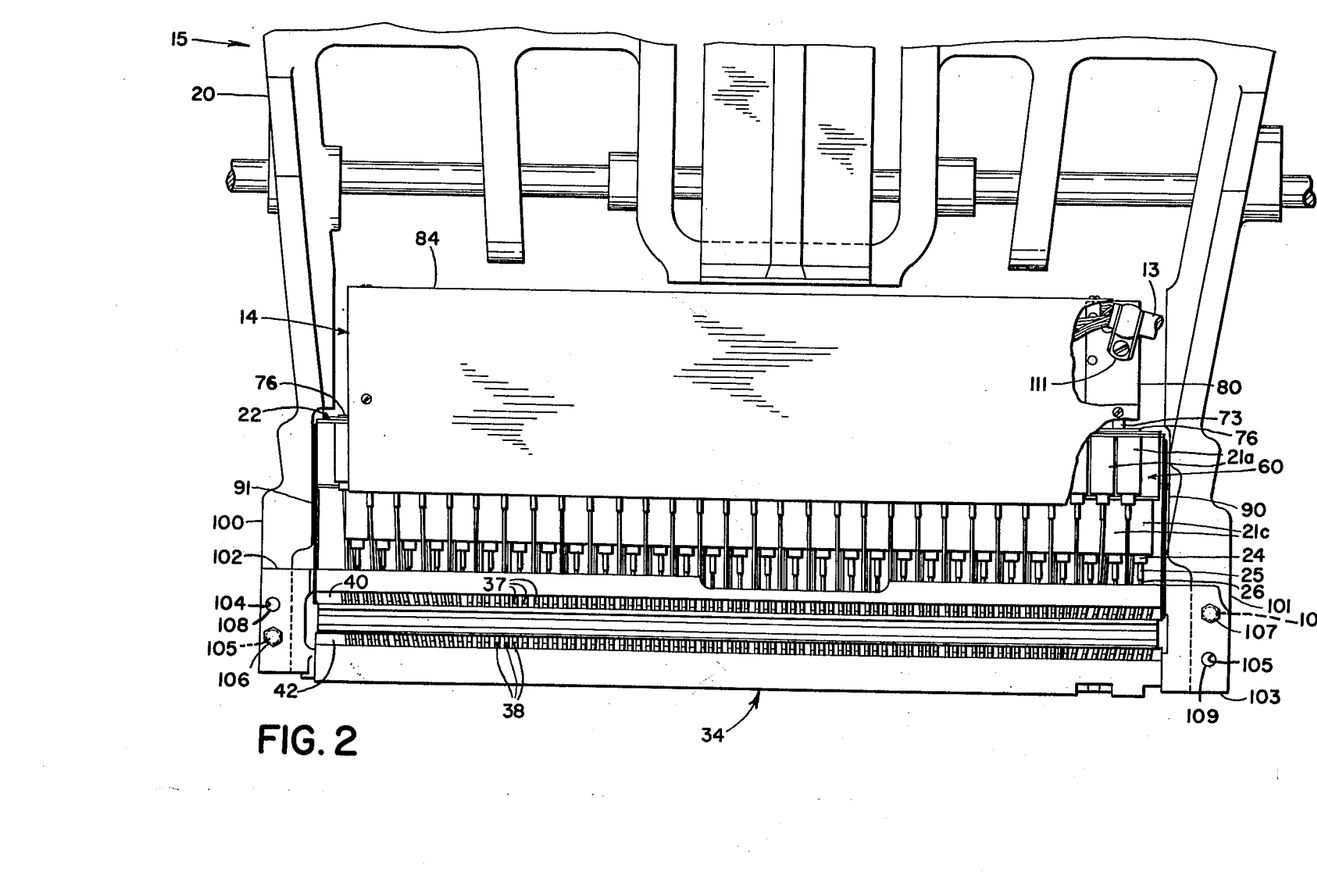
FIGURE 2 is a front view, partially broken away for convenience, of the lower portion of a magazine frame of a line casting machine, together with certain parts of the control system of FIGURE 1.

If desired, a cover 84 may be positioned on the operating unit 14 adjacent the rectifier panels 80 and 81, as shown in FIGURES 2 and 4. The cover 84 has a cross-section substantially in the shape of an inverted U and extends longitudinally over the panels 80 and 81. Cover 84 is rigidly maintained with respect to the mounting posts 73, 74 and 75 by appropriate spacers 85 which extend outwardly from the panels 80 and 81 and are fixedly secured to the cover 84 by screws 86 or other suitable means.

The assembled operating unit 14 for the line casting machine is maintained in rigid relationship with the escapement mechanism 34 by two legs 90 and 91 of similar construction which depend from opposite ends of the mounting bracket 22. The leg 90 is best shown in FIGURE 7B. The upper portion of the leg 90 is welded or otherwise secured to two extensions 92 and 93 which project in opposite directions at right angles to the longitudinal direction of the bracket 22 at one end thereof and are integrally formed with the bracket portions 61 and 64, respectively. The upper portion of the leg 91 is similarly affixed at the other end of bracket 22 to two extensions 94 and 95 (FIGURE 4). The lower portions of legs 90 and 91 are rigidly secured to opposite ends of the escapement mechanism 34, and thus the mounting bracket 22 (together with the solenoids 21, the rectifier panels 80 and 81, and other associated parts of the operating unit 14) is firmly maintained in spaced, parallel relationship therewith.

After the mounting bracket 22 is secured to the escapement mechanism 34, the plungers 24 of the various solenoids 21 are respectively attached to the corresponding rocker members 32 by means of the operating rods 26 and the set screws 30 in a manner described heretofore. There may be instances where the plunger 24 of a particular solenoid 21 is not exactly in line with its corresponding operating rod 26. However, the necessity for such exact alignment has been substantially eliminated through the use of the flexible tubes 25 which enable the various operating rods 26 to depend at an angle with respect to the corresponding plungers 24 without deleterious effect.

As shown in FIGURE 2, the assembly comprising the operating unit 14 and the escapement mechanism 34 is secured directly to a magazine frame 20 of the line casting machine 15 between two depending arms 100 and 101 thereof. For this purpose, ears 102 and 103 respectively extend from opposite ends of the escapement mechanism 34 and are each provided with an upper aperture 104 and a lower aperture 105. The lower aperture 105 of ear 102 and the upper aperture 104 of ear 103 accommodate mounting bolts 106 and 107, respectively. The bolt 106 extends through the lowermost portion of the frame arm 100, while bolt 107 is inserted in the arm 101 immediately above the lowermost portion thereof. The upper aperture 104 of ear 102 and the lower aperture 105 of ear 103 mate with corresponding guide pins 108 and 109. Guide pin 108 protrudes from the arm 100 of frame 20 and is located immediately above the mounting bolt 106, while guide pin 109 extends from the lowermost portion of frame arm 101 below the mounting bolt 107. The cable 13 containing the electrical wiring leading from the relay box 12 (FIGURE 1) to the escapement operating unit 14 is held in position on the rectifier mounting panel 80 by a suitable bracket 111.

The escapement mechanism 34 (FIGURE 2), together with the operating unit 14 mounted thereon, can be quickly and easily secured to and removed from the magazine frame 20. These components are accurately located by means of the guide pins 108 and 109 and are rigidly held in an operative position by the bolts 106 and 107. Should a particular solenoid 21 or other component in the operating unit 14 burn out, for example, and thereby necessitate its repair or replacement, the operating unit 14 is electrically disconnected from the relay box 12 (FIGURE 1) by a suitable plug and socket arrangement (not shown in FIGURES 1 and 2) intermediate the ends of the cable 13. The bolts 106 and 107 are removed, and the operating unit 14 and attached escapement mechanism 34 are lifted from the magazine frame 20 of the line casting machine. During the maintenance of these parts, an alternate operating unit and escapement mechanism are positioned on frame 20, where they are aligned by means of the pins 108 and 109 and are held in position by the bolts 106 and 107. In this manner, any delays in the operation of the line casting machine 15 are kept at a minimum since the necessary maintenance can be performed while the machine is under the control of the alternate operating unit and escapement mechanism.

Figure 8:
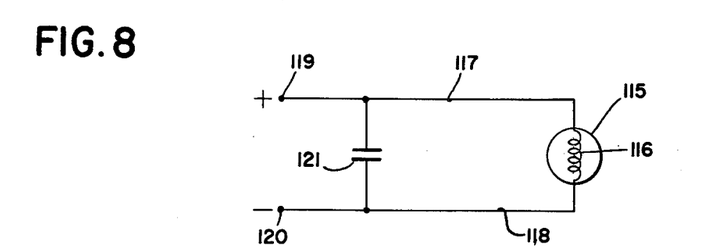
FIGURE 8 is a partial schematic wiring diagram of electrical circuitry useful in connection with the release of space bands in accordance with the invention.
Figure 9:
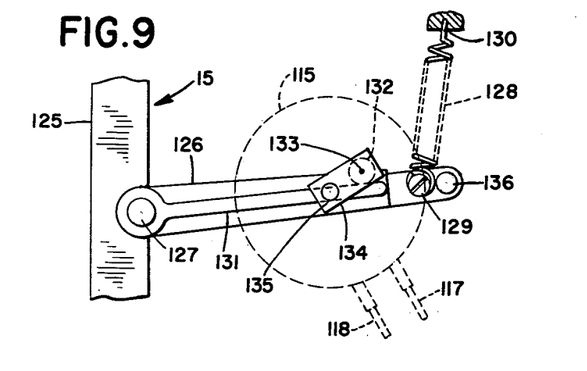
FIGURE 9 is a detail view, partly in elevation and partly schematic, illustrating certain portions of the space band releasing means.

As has been indicated heretofore, the various matrices released from the magazine 50 of the line casting machine 15 drop to an assembly point on the machine where they are assembled, along with appropriate space bands, to form a line of type. The space bands customarily are stored in a suitable space band box (not shown) which is located on the line casting machine immediately above the assembly point. In accordance with certain embodiments of the present invention, these space bands are automatically released in response to an appropriate space band signal from the tape box 10 by means of a rotary solenoid 115, as shown in FIGURES 8 and 9. The solenoid 115 includes an energizing winding 116 which is connected at one end to a conductor 117 and at the other end to a conductor 118. The free end of the conductor 117 is attached to a terminal 119, while the free end of the conductor 118 is secured to a terminal 120. A capacitor 121 is connected across the conductors 117 and 118 in parallel with the solenoid 115.

The terminals 119 and 120 are adapted to be connected through appropriate circuitry, relays, switches, etc., in the tape box 10, the relay box 12 and the timing unit 17 (FIGURE 1) to a suitable source of electrical potential. Although for purposes of clarity these connections have not been shown in the drawings, the terminals 119 and 120 illustratively may be connected electrically in a manner similar to the various space band solenoids shown in the aforementioned Ackell patents. Thus, as an illustration, these terminals may be connected to a suitable direct current voltage source in a manner similar to the space band solenoid shown in FIGURE 1a of Ackell Patent 2,846,055. In this illustration, the positive line 230 of Ackell is connected to the terminal 119, while Ackell's negative line 231 is connected to the terminal 120.

Referring to FIGURE 9, the line casting machine 15 includes an upstanding member 125 which is disposed adjacent the space band box (not shown) of the machine. An elongated arm 126 is pivotally connected at one end thereof to the upstanding member 125 by means of a pin 127. The arm 126 extends horizontally, as viewed in FIGURE 9, and is supported adjacent its other end by a coil spring 128, one end of which is affixed to the arm 126 by a screw 129. The opposite end of the spring 128 is suitably secured, as at 130, to a portion of the line casting machine.

The elongated arm 126 includes a flange 131 extending longitudinally therewith in a horizontal plane. A spherical roller 132 rests against the upper surface of the flange 131 and is adapted to rotate about a pin 133 mounted at one end of a switch arm 134. The other end of the arm 134 is rigidly affixed to a shaft 135 which comprises the armature for the rotary solenoid 115. Although the solenoid 115 is mounted in front of the switch arm 134 and hence normally would obscure the arm as viewed in FIGURE 9, for purposes of clarity its location has been shown by dotted lines in this figure.

As will be understood, the space bands are released by a suitable releasing mechanism (not shown) which is actuated by a pin 136 at the end of arm 126 adjacent the screw 129. The pin 136 is adapted to first move in a downward direction, as viewed in FIGURE 9, to thereby condition the releasing mechanism for the release of a space band. Upon upward movement of pin 136, a space band drops from the space band box and is assembled in a line of type.

Upon the appearance of information on the control tape in the tape box 10 (FIGURE 1) indicative of a space band, signals are transmitted over the cable 11 to the relay box 12 to thereby energize certain of the relays therein and complete an electrical path to the terminals 119 and 120 (FIGURE 8). At an appropriate time in the cycle, a signal is transmitted from the timing unit 17 over this path to the conductors 117 and 118, thereby energizing the rotary solenoid 115 and charging the capacitor 121. Energization of the solenoid 115 rotates the solenoid shaft 135, together with the arm 134 affixed thereto, in a clockwise direction, as viewed in FIGURE 9, and the roller 132 bears against the flange 131 to rotate the arm 126 clockwise about the pin 127 against the tension of the coil spring 128. This rotation of the arm 126 moves the pin 136 in a downward direction, thereby conditioning the space band releasing mechanism.

The solenoid 115 is held in its energized condition after the termination of the voltage signal across the terminals 119 and 120 by means of the capacitor 121. Upon the completion of the discharge of this capacitor, the solenoid 115 returns to its normal (unenergized) condition, and the arm 126 pivots in a counterclockwise direction about the pin 127 by reason of the spring 128. The resulting upward movement of the pin 136 actuates the releasing mechanism to cause a space band to drop from the space band box to the assembly point.

In the usual line casting machine, the time required for a released space band to reach the assembly point is less than that required for a released matrix, and it is therefore advantageous to prevent the space bands from reaching the assembly point ahead of their intended position in the line of type being formed. The apparatus described above insures that a particular space band reaches the assembly point in its proper sequence. Thus, by means of the capacitor 121 and the solenoid 115, together with associated parts, there is a lapse of time between the appearance of a space band release signal at the terminals 119 and 120 and the deenergization of solenoid 115 and resulting upward movement of pin 136 to release a space band. This time lapse may be adjusted by varying the time constant of the capacitor-solenoid circuit and/or the tension in the spring 128 to insure that the space bands are assembled at their intended location in the line of type and not ahead of the preceding matrix, for example. In one satisfactory embodiment, the time constant and spring tension are adjusted so that the time lapse is equal to slightly less than one complete revolution of the control shaft in the timing unit 17.

Figure 10:
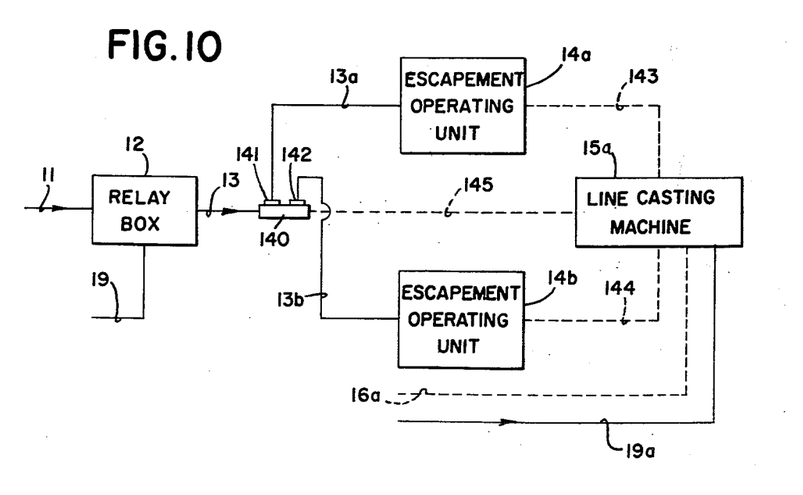
FIGURE 10 is a schematic block diagram, in part similar to FIGURE 1, illustrating certain additional components of a control system constructed in accordance with the invention.
Figure 11:
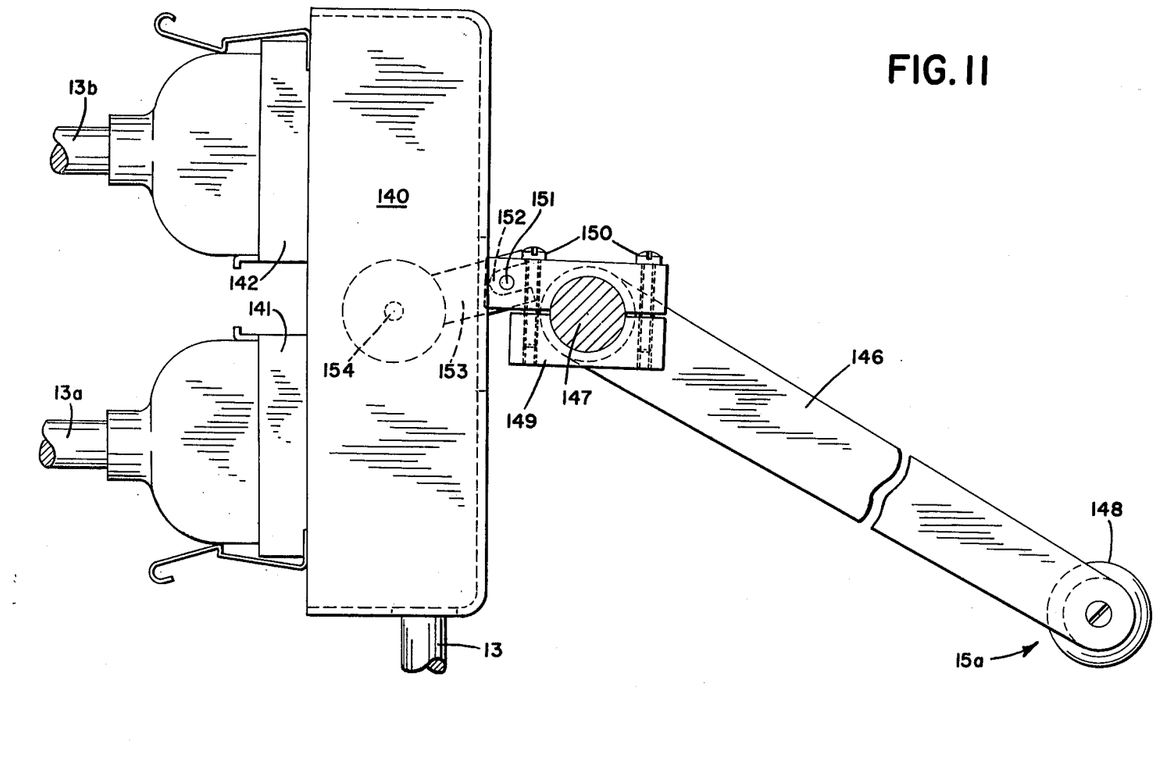
FIGURE 11 is a side view of a portion of a magazine positioning mechanism of a line casting machine, together with certain parts of the control system of FIGURE 10.

In many types of line casting machines there are provided a plurality of magazines, each similar to the magazine 50 of FIGURES 5 and 6, which may be mounted one above or outwardly of the other on appropriate magazine frames and selectively positioned in an operative location on the machine. Each magazine customarily carries matrices adapted for the formation of a particular style of lettering. In accordance with certain embodiments of the present invention, an operating unit and an escapement mechanism are mounted on the frame 20 supporting each such magazine. As shown in FIGURES 10 and 11, the cable 13 leading from the relay box 12 is connected to a multi-contact switch 140 which is adapted upon actuation to transfer the leads in cable 13 between two output sockets 141 and 142. Although many types of switches may be employed for this purpose, one satisfactory switch is similar to that sold by International Instruments, Inc. catalogue No. 58024N. This International Instruments switch is capable of establishing thirty connections between the cable 13 and the sockets 141 or 142, although only twenty-seven of these connections are employed in the illustrated embodiment of the invention.

The output socket 141 is connected by a cable 13a to an escapement operating unit 14a mounted in operable relationship with one of the magazines of a line casting machine 15a. Similarly, the output socket 142 is connected by a cable 13b to an escapement operating unit 14b in operable relationship with another magazine of the machine 15a. The construction and general mode of operation of the operating units 14a and 14b in the release of matrices from the corresponding magazine and the manner in which these operating units are detachably mounted on the respective magazine frames (see the frame 20 of FIGURE 2, for example) are similar to that described heretofore in connection with the operating unit 14. In FIGURE 10, the physical relationship between the operating units 14a and 14b and the magazine frames of the line casting machine 15a is represented schematically by dotted lines 143 and 144.

As shown schematically by the dotted line 145, the switch 140 is mounted on the line casting machine 15a adjacent a magazine shift lever 146 (FIGURE 11). The lever 146 is affixed to a rotatable shaft 147 adjacent one end thereof and includes an operating handle 148 at the other end thereof. As is well known, upward movement of the handle 148, as viewed in FIGURE 11, is adapted to rotate the shaft 147 through a suitable arc to thereby shift from one matrix magazine to the other. Upon the return of the handle 148 to the position shown, the initial magazine is returned to an operable location on the machine.

Rigidly mounted on the shaft 147 is an actuator bracket 149. The bracket 149 is held in position by suitable screws 150 and includes a pin 151 on the outer portion thereof which extends in a direction parallel to the axial direction of shaft 147. The pin 151 is disposed in a U-shaped recess 152 at one end of a switch arm 153, the other end of which is affixed to a contact positioning shaft 154 of the switch 140.

When it is desired to shift from one magazine to another, such as to change styles of lettering, for example, the handle 148 is moved in an upward direction, as viewed in FIGURE 11, to thereby rotate the shaft 147 counterclockwise through a suitable arc. As the shaft 147 rotates, the magaizne 50 associated with the escapement operating unit 14a moves from an operable location on the line casting machine 15a, and the alternate magazine associated with the operating unit 14b moves into position.

During the counterclockwise rotation of the shaft 147, the pin 151 on the switch actuator bracket 149 moves downwardly to similarly move the outer end of the arm 153. Movement of arm 153 rotates the contact positioning shaft 154 of switch 140 in a clockwise direction, thereby transferring the various leads in the cable 13 from the socket 141 to the socket 142. As a result, the cable 13 is automatically disconnected from the cable 13a for the operating unit 14a and is connected to the cable 13b for the operating unit 14b corresponding to the alternate magazine. Operation of the line casting machine 15a is continued by means of the operating unit 14b under the control of the tape in the tape box 10 (FIGURE 1) in the manner described heretofore.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. In an automatic control system for a line casting machine having a matrix storage magazine and a frame member for supporting said magazine, in combination, an escapement mechanism for sequentially discharging individual matrices from said magazine, said mechanism including a plurality of rocker members in operable relationship with said magazine, one of said rocker members being provided for each different type of matrix to be released, each of said members being adapted for rotation between an unoperated and an operated position, an operating unit including a plurality of solenoids, one for each of said rocker members, each of said solenoids having an armature portion directly and flexibly connected to the corresponding rocker member, and said operating unit including a plurality of unidirectional current devices electrically connected to said solenoids, means including said unidirectional current devices for selectively energizing said solenoids, energization of a selected one of said solenoids being adapted to actuate the armature portion thereof and thereby rotate the corresponding rocker member to its operated position to release a matrix of the corresponding type, all of the matrices for a given line of type being released at uniform intervals, a plurality of coil springs respectively connected to each of said rocker members, each of said springs being adapted to return the rocker member connected thereto to its unoperated position immediately upon deenergization of the corresponding, selected solenoid, means for maintaining said solenoids and said unidirectional current devices in fixed relationship with each other and with said escapement mechanism, and means for detachably securing said escapement mechanism to said frame member.

2. In an automatic control system for a line casting machine having matrix storing means and a machine frame member including an elongated portion for supporting said storing means, in combination, releasing means in operative relationship with said storing means for discharging individual matrices therefrom, said releasing means including a plurality of matrix discharge members in juxtaposition with said storing means, one of said discharge members being provided for each different type of matrix to be released, an operating unit including a first and a second group of current responsive devices for operating said releasing means, one of said current responsive devices being provided for each of said discharge members, each of said current responsive devices having an armature portion directly connected to the corresponding discharge member, and said operating unit including a plurality of unidirectional current devices electrically connected to said current responsive devices, elongated support means mounted on said releasing means for maintaining said operating unit in rigid relationship therewith, said support means including a first portion for supporting said first group of said current responsive devices in spaced, side by side relationship with each other, including a second portion for supporting said second group of current responsive devices in spaced, side by side relationship with each other and including a third portion for supporting said unidirectional current devices, and means for detachably securing said releasing means, together with the operating unit attached thereto, to the storing means supporting portion of said frame member.

3. In an automatic control system for a line casting machine having matrix storing means and a frame member for supporting said storing means, in combination, releasing means detachably secured to said frame member and in operative relationship with said storing means for sequentially discharging individual matrices therefrom, said releasing means including a plurality of matrix discharge members in juxtaposition with said storing means, one of said discharge members being provided for each different type of matrix to be released, each of said discharge members being adapted for rotation between an unoperated and an operated position, an operating unit including a first and a second group of current responsive devices for operating said releasing means, one of said current responsive devices being provided for each of said discharge members, each of said current responsive devices having an armature portion directly connected to the corresponding discharge member, and said operating unit including a plurality of unidirectional current devices electrically connected to said current responsive devices, means for selectively energizing said current responsive devices, energization of a selected one of said devices adapted to actuate the armature portion thereof and thereby rotate the corresponding discharge member to its operated position to release a matrix of the corresponding type, all of the matrices for a given line of type being released at uniform intervals, and elongated support means mounted on said releasing means for maintaining said operating unit in rigid relationship therewith, said support means including a first flange portion for supporting said first group of current responsive devices in spaced, side by side relationship with each other, including a second flange portion for supporting said second group of current responsive devices in spaced, side by side relationship with each other and including an upstanding portion for supporting said unidirectional current devices.

4. In an automatic control system for a line casting machine having matrix storing means and a frame member for supporting said storing means, in combination, matrix releasing means detachably secured to said frame member for discharging individual matrices from said matrix storing means, said matrix releasing means including a plurality of rocker members in juxtaposition with said storing means, one of said members being provided for each different type of matrix to be released and each of said members being adapted for rocking movement between an unoperated and an operated position, an operating unit including a first and a second group of solenoids, one of said solenoids being provided for each of said rocker members, each of said solenoids having an armature portion directly and flexibly connected to the corresponding rocker member, and said operating unit including a plurality of unidirectional current devices electrically connected to said solenoids, means for selectively energizing said solenoids, energization of a selected one of said solenoids being adapted to actuate the armature portion thereof and thereby move the corresponding rocker member to its operated position to release a matrix of the corresponding type, all of the matrices for a given line of type being released at uniform intervals, biasing means affixed to each of said rocker members for returning the rocker member corresponding to a selected solenoid to its unoperated position immediately upon deenergization thereof, and an elongated support bracket mounted on said releasing means for maintaining said operating unit in rigid relationship therewith, said bracket including a first longitudinal flange portion for supporting said first group of current responsive devices in spaced, side by side relationship with each other, including a second longitudinal flange portion for supporting said second group of current responsive devices in spaced, side by side relationship with each other and including an upstanding portion rigidly affixed to said first and second portions for supporting said unidirectional current devices.

5. In an automatic control system for a line casting machine having a matrix storage magazine and a frame member for supporting said magazine, in combination, an escapement mechanism for sequentially discharging individual matrices from said magazine, said mechanism including a plurality of rocker members in operable relationship with said magazine, one of said rocker members being provided for each different type of matrix to be released and each of said members being adapted for rotation between an unoperated and an operated position, an operating unit including a first and a second group of solenoids, one of said solenoids being provided for each of said rocker members, each of said solenoids having a movable plunger directly and flexibly connected to the corresponding rocker member, and said operating unit including a plurality of rectifiers electrically connected to said solenoids, means for selectively energizing said solenoids, energization of a selected one of said solenoids being adapted to actuate the plunger thereof and thereby rotate the corresponding rocker member to its operated position to release a matrix of the corresponding type, all of the matrices for a given line of type being released at uniform intervals, biasing means for said rocker members including a plurality of coil springs respectively affixed to each of said rocker members, each of said coil springs being adapted to return the corresponding rocker member to its unoperated position immediately upon deenergization of the corresponding, selected solenoid, an elongated support bracket mounted on said escapement mechanism for maintaining said operating unit in rigid relationship therewith, said support bracket including a first and a second longitudinal flange in substantial coplanar alignment with each other and including an upstanding portion extending at right angles to the plane of said flanges, the solenoids in said first group being rigidly affixed to said first flange in spaced, side by side relationship with each other, the solenoids in said second group being rigidly affixed to said second flange in spaced, side by side relationship with each other and said rectifiers being positioned on said upstanding portion, and means for detachably securing said escapement mechanism to said frame member.

6. An automatic control system for a line casting machine having matrix storage means and a frame member for supporting said storing means, said system comprising, in combination, a device for advancing and analyzing a control tape, timing means for controlling the operation of said tape advancing and analyzing device, matrix releasing means detachably secured to said frame member for discharging individual matrices from said matrix storing means, said matrix releasing means including a plurality of rocker members in juxtaposition with said storing means, one of said rocker members being provided for each different type of matrix to be released and each of said rocker members being adapted for rocking movement between an unoperated and an operated position, an operating unit including a plurality of solenoids, one of said solenoids being provided for each of said rocker members, each of said solenoids having an armature portion directly and flexibly connected to the corresponding rocker member, and said operating unit including a plurality of rectifiers electrically connected to said solenoids, circuit means responsive to said tape advancing and analyzing device for selectively energizing said solenoids, energization of a selected one of said solenoids being adapted to actuate the armature portion thereof and thereby move the corresponding rocker member to its operated position to release a matrix of the corresponding type, all of the matrices for a given line of type being released at uniform intervals, biasing means affixed to each of said rocker members for returning the rocker member corresponding to a selected solenoid to its unoperated position immediately upon deenergization thereof, and support means mounted on said releasing means for maintaining said operating unit in rigid relationship therewith, said support means including a first portion for supporting said solenoids in spaced, side by side relationship with each other and including a second portion for supporting said rectifiers.

7. An automatic control system for a line casting machine having a matrix storage magazine and a frame member for supporting said magazine, said system comprising, in combination, a device for advancing and analyzing a control tape, timing means for controlling the operation of said tape advancing and analyzing device, an escapement mechanism for sequentially discharging individual matrices from said magazine, said mechanism including a plurality of rocker members in operable relationship with said magazine, one of said rocker members being provided for each different type of matrix to be released and each of said rocker members being adapted for rotation between an unoperated and an operated position, an operating unit including a first and a second group of solenoids, one of said solenoids being provided for each of said rocker members, each of said solenoids having a movable plunger directly and flexibly connected to the corresponding rocker member, and said operating unit including a plurality of rectifiers electrically connected to said solenoids, relay means responsive to said tape advancing and analyzing device for selectively energizing said solenoids, energization of a selected one of said solenoids being adapted to actuate the plunger thereof and thereby rotate the corresponding rocker member to its operated position to release a matrix of the corresponding type, all of the matrices for a given line of type being released at uniform intervals, biasing means for said rocker members including a plurality of coil springs respectively affixed to each of said rocker members, each of said coil springs being adapted to return the corresponding rocker member to its unoperated position immediately upon deenergization of the corresponding, selected solenoid, an elongated support bracket mounted on said escapement mechanism for maintaining said operating unit in rigid relationship therewith, said support bracket including a first and a second longitudinal flange in substantial coplanar alignment with each other and including an upstanding portion extending at right angles to the plane of said flanges, the solenoids in said first group being rigidly affixed to said first flange in spaced, side by side relationship with each other, the solenoids in said second group being rigidly affixed to said second flange in spaced, side by side relationship with each other and said rectifiers being positioned on said upstanding portion, and means for detachably securing said escapement mechanism to said frame member.

8. An automatic control system for a line casting machine, said machine including first and second matrix storing means, one of said matrix storing means being disposed in an operable location on said machine and each of said matrix storing means being supported by a frame member, and said machine including means for shifting the other of said matrix storing means to said operable location, said system comprising, in combination, a device for analyzing a control tape, timing means for controlling the operation of said tape analyzing device, first and second matrix discharge means for respectively discharging individual matrices from said first and second matrix storing means, all of the matrices for a given line of type being discharged at uniform intervals, each of said matrix discharge means being detachably connected to the frame member for the corresponding matrix storing means and including a plurality of releasing members, one of said releasing members being provided for each different type of matrix to be released, a first operating unit for operating said first matrix discharge means, a second operating unit for operating said second matrix discharge means, each of said operating units including a plurality of current responsive devices, one for each of the releasing members in the corresponding matrix discharge means, each of said current responsive devices having an armature portion directly and positively connected to the corresponding releasing member, means for maintaining the current responsive devices in each of said operating units in rigid relationship with each other and with the corresponding matrix discharge means, circuit means responsive to said tape analyzing device and connected to one of said operating units for controlling the selective operation of the current responsive devices therein, said one operating unit corresponding to the matrix discharge means for said one matrix storing means, and means automatically responsive to the shifting of said other matrix storing means to said operable location for connecting said circuit means to the other of said operating units for controlling the selective operation of the current responsive devices therein.

9. An automatic control system for a line casting machine, said machine including first and second matrix storage magazines respectively supported on first and second magazine frame members, one of said magazines being disposed in an operable location on said machine, and said machine including means for shifting the other of said magazines to said operable location, said system comprising, in combination, a device for advancing and analyzing a control tape, timing means for controlling the operation of said tape advancing and analyzing device, a first and a second escapement mechanism for respectively discharging individual matrices from said first and second magazines, each of said escapement mechanisms being detachably secured to the frame member for the corresponding magazine and including a plurality of rocker members in juxtaposition with said corresponding magazine, one of said rocker members being provided for each different type of matrix to be released and each of said rocker members being adapted for rocking movement between an unoperated and an operated position, a first operating unit for selectively operating the rocker members in said first escapement mechanism, a second operating unit for selectively operating the rocker members in said second escapement mechanism, each of said operating units including a plurality of solenoids, one for each of the rocker members in the corresponding escapement mechanism, each of said solenoids having an armature portion directly and positively connected to the corresponding rocker member, and each of said operating units including a plurality of rectifiers electrically connected to the solenoids therein, support means mounted on each of said escapement mechanisms for maintaining the corresponding operating unit in rigid relationship therewith, circuit means responsive to said tape advancing and analyzing device and connected to one of said operating units for selectively energizing the solenoids therein, said one operating unit corresponding to the escapement mechanism for said one magazine, and means automatically responsive to the shifting of said other magazine to said operable location and including a multi-contact switch for electrically connecting said circuit means to the other of said operating units to thereby selectively energize the solenoids therein, energization of a selected one of the solenoids in each of said operating units being adapted to actuate the armature portion thereof and thereby move the corresponding rocker member to its operated position to release a matrix of the corresponding type.

10. In an automatic control system for a line casting machine, said machine having matrix storing means and a frame member for supporting said storing means and including space band releasing means, in combination, matrix releasing means detachably mounted on said frame member for discharging individual matrices from said matrix storing means, said matrix releasing means including a plurality of discharge members movable between an unoperated and an operated position, one of said discharge members being provided for each different type of matrix to be released, an operating unit including a plurality of solenoids, one for each of said discharge members, each of said solenoids having an armature portion directly connected to the corresponding discharge member, an additional solenoid mounted on said machine for controlling the operation of said space band releasing means, means for selectively energizing said plurality of solenoids and said additional solenoid, energization of a selected one of said plurality of solenoids being adapted to actuate the armature portion thereof and thereby move the corresponding discharge member to its operated position to release a matrix of the corresponding type, all of the matrices for a given line of type being discharged at uniform intervals, energization of said additional solenoid being adapted to condition said space band releasing means for operation, biasing means connected to each of said discharge members, each of said biasing means being adapted to return the discharge member connected thereto to its unoperated position immediately upon the deenergization of the corresponding solenoid, means responsive to the deenergization of said additional solenoid and operable at a predetermined time interval thereafter for actuating said space band releasing means, and means for maintaining said plurality of solenoids in fixed relationship with each other and with said matrix releasing means.

11. In a control system for a line casting machine, said machine having matrix storing means, space band storing means and a manually operable keyboard mechanism for controlling the release of selected matrices and space bands from said matrix and space band storing means, in combination, matrix releasing means operable under the control of said keyboard mechanism for sequentially discharging individual matrices from said matrix storing means, said matrix releasing means including a plurality of matrix discharge members in juxtaposition with said matrix storing means, one of said members being provided for each different type of matrix to be released, an operating unit including a plurality of current responsive devices, one for each of said discharge members, for automatically operating the same independently of said keyboard mechanism, each of said current responsive devices having an armature portion directly connected to the corresponding discharge member, space band releasing means operable under the control of said keyboard mechanism for discharging individual space bands from said space band storing means, an additional current responsive device for automatically controlling said space band releasing means independently of said keyboard mechanism, timing means for selectively energizing said current responsive devices at predetermined intervals, energization of a selected one of said plurality of current responsive devices automatically operating the associated discharge member to release a matrix of the corresponding type, all of the matrices released for a given line of type during the automatic operation of said matrix releasing means being discharged at uniform intervals, energization of said additional current responsive device conditioning said space band releasing means for operation, and means responsive to the deenergization of said additional current responsive device and operable at a predetermined time interval thereafter for automatically actuating said space band releasing means to release a space band, whereby the release of the matrices and space bands from said matrix and space band storing means is adapted to be controlled either manually by said keyboard mechanism or automatically by said current responsive devices and said timing means.

12. In a control system for a line casting machine, said machine having matrix storing means, space band storing means and a manually operable keyboard mechanism for controlling the release of selected matrices and space bands from said matrix and space band storing means, in combination, matrix releasing means operable under the control of said keyboard mechanism for sequentially discharging individual matrices from said matrix storing means, said matrix releasing means including a plurality of matrix discharge members in juxtaposition with said matrix storing means, one of said members being provided for each different type of matrix to be released, an operating unit including a plurality of solenoids, one for each of said discharge members, for automatically operating the same independently of said keyboard mechanism, each of said solenoids having an armature portion directly and flexibly connected to the corresponding discharge member, space band releasing means operable under the control of said keyboard mechanism for discharging individual space bands from said space band storing means, means including an additional solenoid for automatically controlling said space band releasing means independently of said keyboard mechanism, timing means for selectively energizing said solenoids at predetermined intervals, energization of a selected one of said plurality of solenoids automatically operating the associated discharge member to release a matrix of the corresponding type, all of the matrices released for a given line of type during the automatic operation of said matrix releasing means being discharged at uniform intervals, energization of said additional solenoid conditioning said space band releasing means for operation, spring means for each of said matrix discharge members, said spring means being adapted to return the discharge member corresponding to a selected one of said plurality of solenoids to its unoperated position immediately upon the deenergization thereof, and means responsive to the deenergization of said additional solenoid and operable at a predetermined time interval thereafter for automatically actuating said space band releasing means to release a space band, whereby the release of the matrices and space bands from said matrix and space band storing means is adapted to be controlled either manually by said keyboard mechanism or automatically by said solenoids and said timing means.

References Cited in the file of this patent

UNITED STATES PATENTS

| | | |
|---|---|---|
| 1,918,629 | Blume | July 18, 1933 |
| 2,846,055 | Ackell | Aug. 5, 1958 |
| 2,869,717 | Rossetto et al. | Jan. 20, 1959 |